Figures 1, 2:
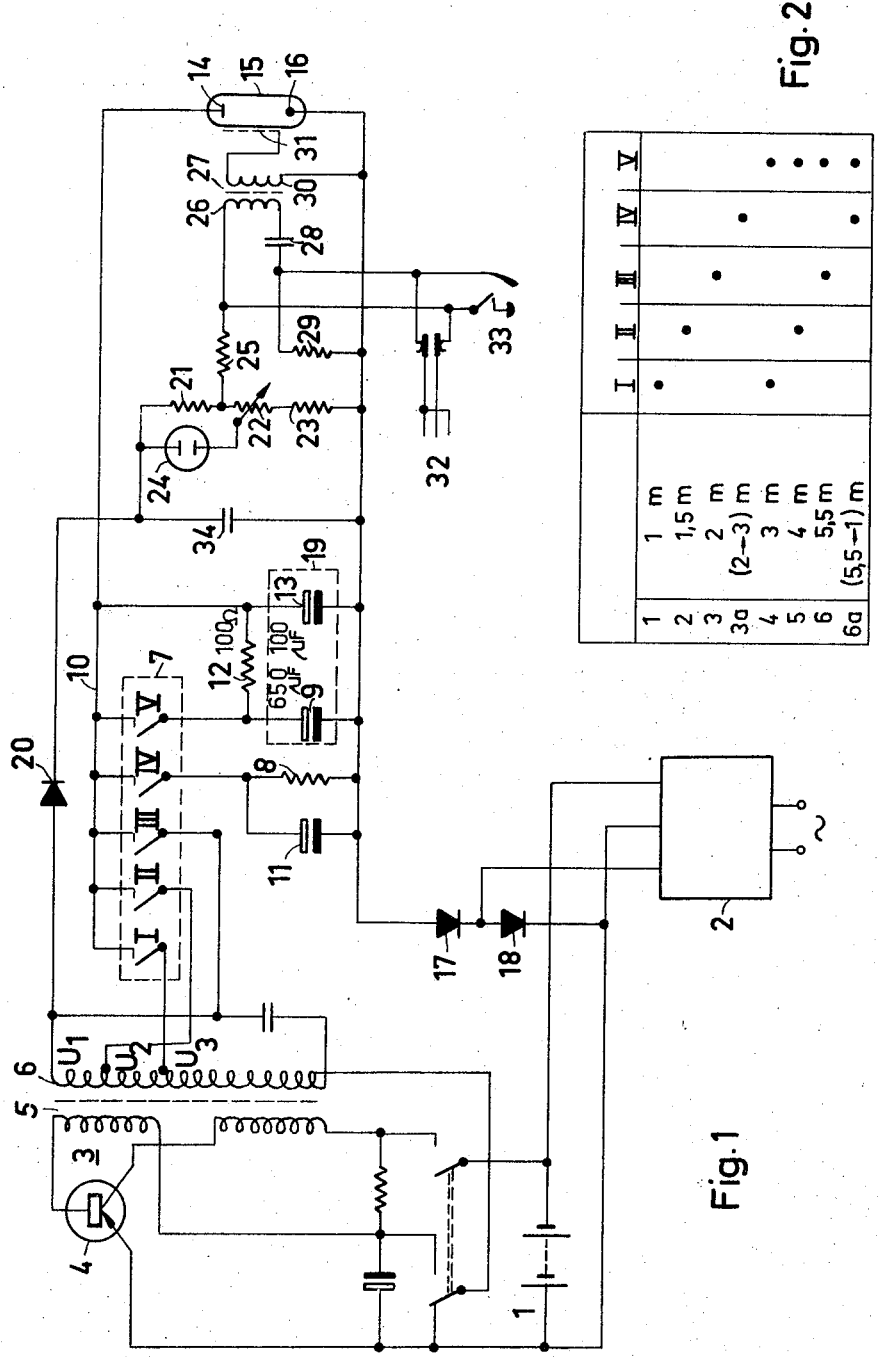

United States Patent
Ratsch

[15] 3,651,373
[45] Mar. 21, 1972

[54] ELECTRONIC FLASH UNIT WITH ADJUSTABLE FLASH ENERGY

[72] Inventor: Joachim Ratsch, Berlin, Germany
[73] Assignee: Loewe Opta GmbH, Berlin, Germany
[22] Filed: May 2, 1969
[21] Appl. No.: 826,302

[30] Foreign Application Priority Data

May 22, 1968 Germany..................P 17 64 360.6

[52] U.S. Cl..............................315/241, 315/227, 315/241 P
[51] Int. Cl.......................................................H05b 37/00
[58] Field of Search..............................315/227, 241, 241 P

[56] References Cited

UNITED STATES PATENTS

| | | | |
|---|---|---|---|
| 2,331,317 | 10/1943 | Germeshausen | 315/241 P |
| 2,342,257 | 2/1944 | Edgerton | 315/241 P |
| 2,906,924 | 9/1959 | Frungel | 315/241 P |
| 2,917,668 | 12/1959 | Witterson | 315/241 P |
| 3,267,328 | 8/1966 | Girard | 315/241 P |

*Primary Examiner*—Roy Lake
*Assistant Examiner*—Lawrence J. Dahl

[57] ABSTRACT

An electronic flash unit with flash energy adjustable by switching on or off storage capacitors interconnected in parallel which are connected to a high-tension source. For increasing the number of flash energy stages (guide numbers) obtainable with a definite number of storage capacitors an energy switch is provided with whose contacts the storage capacitors can be as required connected in parallel and are at the same time connectable at various high potentials of the high-tension source.

8 Claims, 2 Drawing Figures

Inventor:

ELECTRONIC FLASH UNIT WITH ADJUSTABLE FLASH ENERGY

The invention relates to an electronic flash unit with flash energy adjustable through switching on or off storage capacitors mutually parallel-connected and connected to a high-tension source.

Most of the electronic flash units in use today for photographic purposes work with a constant flash energy; so that at given speed of the film material and according to the distance of the subject from the camera a particular lense stop must be chosen. To ascertain the required stop there is an exposure calculator usually fitted to the unit, on which the lense stop can be read off after setting the film speed and the distance.

However, electronic flash units with stepwise or continuously adjustable flash energy are also known. Where for example for illuminating a subject immediately approximate to the camera only relatively low light intensity is required, such a flash unit can be set to a correspondingly low flash energy, which is equivalent to a saving in energy; for in units with constant flash energy the surplus energy must be made ineffectual for lighting the subject by selecting a larger lense stop (smaller aperture).

The flash energy can be altered by e.g., using an adjustable series resistor inserted before the discharge tube or by switching on or off additional capacitors connected in parallel to the storage capacitor. The control or switch for altering the flash energy can also be provided with a scale calibrated in meters so that automatically for each selected distance setting the appropriate flash energy is obtained.

While a reduction of flash energy obtainable by resistance adjustment premises an adjustable heavy-load series resistor, i.e., of relatively large dimension, with parallel-connected additional capacitors a further capacitor is needed for every additional flash energy stage.

The aim of the invention is to avoid the disadvantages of the known energy-commutable electronic flash units.

In accordance with the invention an electronic flash unit with flash energy adjustable by switching on or off storage capacitors interconnected in parallel which are connected to a high-tension source is constructed so that for increasing the number of flash energy stages (guide numbers) obtainable with a definite number of storage capacitors an energy switch is provided with whose contacts the storage capacitors can be as required parallel-connected and are at the same time connectable to various high potentials of the high-tension source.

Further details of the invention are explained with reference to the drawing, in which in FIG. 1 a wiring of a complete electronic flash unit with a six-stage flash-energy commutation and in FIG. 2 a contact diagram for a flash energy selector switch are represented.

With reference to FIG. 1 the electronic flash unit with adjustable flash energy is operated from a battery 1. Where as current source storage battery cells (nickel-cadmium cells) are used, these can be charged from the AC mains by the charging unit 2 indicated in the drawing as a block diagram symbol, said unit comprising a mains rectifier.

In a known manner the circuit comprises a DC transverter 3 (current controlled flow transverter) with a transistor 4 and a transformer 5, on whose secondary winding 6 three different potentials $U_1$, $U_2$, $U_3$ are available. The potentials are fed to contacts I to III of a flash energy selector switch 7, the smallest potential, $U_3$, to contact I, potential $U_2$ to contact II, and the highest potential, $U_1$, occurring at the end of the secondary winding 6 of the transformer 5, to contact III. The named contact as well as two further contacts IV, V are normally open contacts whose terminals separable from transformer 5 and/or resistor 8 and storage capacitor 9 are interconnected by a line 10.

To resistor 8 a capacitor 11 and to storage capacitor 9 a series circuit consisting of a resistor 12 and a further storage capacitor 13 are connected in parallel. Line 10 leads to the connecting point between resistor 12 and storage capacitor 13 and further to anode 14 of a flash discharge tube 15. The terminals of capacitors 9, 11 and 13 and of resistor 8 not connected to switch contacts IV, V, are in connection, as does cathode 16 of discharge tube 15, via two HT rectifiers 17, 18 to a common reference potential.

Storage capacitors 9 and 13 are housed in a common case, 19, indicated by broken lines. The secondary winding end of highest potential ($U_1$) is connected via rectifier 20 to the ignition circuit of the flash unit comprising a potentiometer composed of the resistors 21, 22, 23, an indicator lamp 24 bridging resistor 21 and a part of resistor 22, and further a resistor 25 connected at the junction point between resistors 21 and 22, said resistor 25 lying in series with the primary winding 26 of an ignition transformer 27, a capacitor 28, and a resistor 29 connected to the reference potential and/or to the high tension rectifiers 17, 18.

The secondary winding 30 of ignition transformer 27 is connected with one of its ends to the high-tension rectifiers 17, 18 and with its other to an ignition electrode 31 for discharge tube 15.

The synchronizing contact for discharging the flash is marked 32 and a central contact connected parallel thereto at the flash unit foot is marked 33.

Below the manner of operation of the above described circuit is explained only insofar as it directly relates to the flash energy commutation. With the energy switch 7 six different energy values or guide numbers can be set corresponding to six different distances marked on the switch. In accordance with the contact diagram in FIG. 2 the lowest flash energy, i.e., the shortest distance (1 meter, 18 DIN film), is reached in switch position (1.), that is with contact I closed. FIG. 1 shows that then the smallest potential, $U_3$ of e.g., 210 v., lies via switch contact I and line 10 at the storage capacitor 13, e.g., an electrolytic capacitor of about 100 $\mu F$, which stores a definite flash energy. Storage capacitor 9, e.g., an electrolytic capacitor, connected in parallel to storage capacitor 13, in this case also takes up some current, because of resistor 12 of e.g., 100 ohms, and is thus simultaneously formed. The energy stored in capacitor 13 can after the closing of synchronizing contact 32 and the consequent ignition of discharge tube 15 discharge itself via said tube, which causes the tube to light up with a definite flash intensity.

If switch contact II is in closed position (switch position 2) the rather higher potential $U_2$ of e.g., 280 v. then lies at storage capacitor 13, which is thus charged to a higher tension or energy.

As soon as contact III is closed (switch position 3) the full potential $U_1$ (e.g., 250 V) of secondary winding 6 lies at storage capacitor 13, which after charging shows its maximum energy.

In three further switch positions (4.), (5.), (6.) contact V and at the same time one of contacts I to III are closed, which means that as required one of the potentials $U_1$ to $U_3$ lies both at storage capacitor 9 (650 $\mu F$) and at storage capacitor 13 (100 $\mu F$). With the two capacitors 9, 13, which together have a capacitance of 750 $\mu F$, three further energy stages can be realized, according to the potential selected.

Switch positions (3a) and (6a) of energy switch 7 provide that in commutating from switch position (3.) to position (4.) or from (6.) to (1.) any over-high tension at storage capacitors 13 or 9 and 13 is reduced by a short discharge. Discharging is done by resistor 8 (about 300 ohms) which is connected via contact IV and line 10 with storage capacitors 9, 13. Capacitor 11 in combination with resistor 8 quenches the spark at contact IV.

To ensure reliable ignition of flash discharge tube 15 even at low tension of the storage capacitor or capacitors, the ignition circuit is connected over diode 20, in every position of the energy switch 7, with the end of secondary winding 6 of the flow transformer 5. This ensures that the ignition tension is always at the maximum.

A capacitor 34 filters the high voltage peaks behind diode 20. The charging time for capacitor 34 is always equal to the charging time of storage capacitors 9 and/or 13, as even where energy switch 7 is set for a small distance, secondary winding 6 is so strongly loaded by the comparatively big storage capacitors 9, 13, that charging of capacitor 34 only begins when capacitor 13 or capacitors 9, 13 are charged. Despite the very different time constants of storage capacitors 9, 13 and of capacitor 34 the glow lamp 24 only lights up when capacitor 13 or capacitors 9 and 13 are charged to the required voltage.

The advantage of the flash energy commutation described consists in that only as much current is taken from the battery as is needed for the selected distance. So there is no dissipation, through heat development, of the excess flash energy not required for exposure. Thus battery energy is economized and with short distance settings, i.e., in switch positions (1.) or (2.) of energy switch 7, short recovery times and a great number of flashes per battery charge result.

What I claim is:

1. Electronic flash unit for photographic purposes with flash energy adjustable by switching on or off of storage capacitors with respect to a high-tension source, comprising a plurality of storage capacitors, an energy switch with a plurality of contacts, a high-tension source with a plurality of taps conducting various high-tension potentials, a conducting line between said contacts, a flash discharge reproducing circuit containing a flash discharge tube, ignition means and an energizing potential source, said energy switch being adapted to interconnect said storage capacitors as required in parallel and at the same time to connect one of said taps for supplying various high-tension potentials to said flash discharge circuit.

2. Electronic flash unit as claimed in claim 1, wherein said energy switch has five contacts and two storage capacitors and three taps of said high-tension source are provided.

3. Electronic flash unit as claimed in claim 1, wherein as storage capacitors electrolytic capacitors accommodated in a common case are provided.

4. Electronic flash unit as claimed in claim 1, wherein the capacitance values of said storage capacitors are in about 10:1 ratio.

5. Electronic flash unit as claimed in claim 1, wherein said energy switch has four normally open contacts, three of which are each connected with one of said taps, whilst the fourth contact is connected with one of said storage capacitors to which a resistor is connected in parallel, said resistor lying in series with a second storage capacitor, said four contacts being further interconnected by said conducting line which leads to the connecting point between said resistor and said second storage capacitor and to an electrode of said flash discharge tube.

6. Electronic flash as claimed in claim 1, wherein said energy switch has an additional contact, one connection of which is connected with said conducting line and the other connection of which is connected via a capacitively bridged resistor to said energizing potential source.

7. Electronic flash unit as claimed in claim 1, wherein the ignition voltage for said ignition means of said flash discharge tube is taken from that of said taps of said high-tension source supplying the highest potential and led via a diode to said ignition means.

8. Electronic flash unit as claimed in claim 1, wherein the various switch positions of said energy switch are marked by signs corresponding to the various distances usable between the camera and the subject to be photographed.

* * * * *